United States Patent [19]

Farooq

[11] Patent Number: 6,071,614
[45] Date of Patent: Jun. 6, 2000

[54] MICROPOROUS FLUORINATED SILICA AGGLOMERATE AND METHOD OF PREPARING AND USING SAME

[75] Inventor: Omar Farooq, Woodbury, Minn.

[73] Assignee: 3M Innovative Properties Company, St. Paul, Minn.

[21] Appl. No.: 08/892,152

[22] Filed: Jul. 14, 1997

[51] Int. Cl.$^7$ ...................................................... B32B 5/16
[52] U.S. Cl. ........................ 428/403; 423/325; 423/335; 423/341; 423/358; 428/404; 428/406
[58] Field of Search ...................................... 428/402, 403, 428/404, 406; 423/700, 705, 325, 335, 341, 358

[56] References Cited

U.S. PATENT DOCUMENTS

| | | | |
|---|---|---|---|
| 3,702,886 | 11/1972 | Argauer | 423/328 |
| 4,054,689 | 10/1977 | Calvin | 427/215 |
| 4,061,724 | 12/1977 | Grose | 423/335 |
| 4,073,865 | 2/1978 | Flanigen | 423/339 |
| 4,100,337 | 7/1978 | Noshay | 526/130 |
| 4,359,403 | 11/1982 | Hoff | 252/429 B |
| 4,822,903 | 4/1989 | Jacques | 558/312 |
| 5,064,796 | 11/1991 | Speca | 502/107 |
| 5,320,822 | 6/1994 | Ozin et al. | 423/700 |
| 5,599,520 | 2/1997 | Garces et al. | 423/700 |
| 5,688,484 | 11/1997 | Saxton et al. | 423/700 |
| 5,840,217 | 11/1998 | Carrazza et al. | 423/700 |
| 5,849,258 | 12/1998 | Lujano et al. | 423/700 |

FOREIGN PATENT DOCUMENTS

| | | | |
|---|---|---|---|
| 0 249 524 A1 | 4/1987 | European Pat. Off. | C09C 1/30 |
| 2564451 | 11/1985 | France . | |
| 2567868 | 1/1986 | France . | |
| 3-279209 | 12/1991 | Japan . | |

*Primary Examiner*—Hoa T. Le
*Attorney, Agent, or Firm*—Dale A. Bjorkman

[57] ABSTRACT

Microporous fluorinated silica agglomerates are disclosed and their method of preparation from a reaction of colloidal silica of small particle sizes with an alkylamine (or a hindered amine) and hydrofluoric acid or with alkylammonium fluoride, under convenient laboratory conditions at an atmospheric pressure. The agglomerate is useful to interact with dispersants surrounding inkjet ink pigment particles.

19 Claims, No Drawings

MICROPOROUS FLUORINATED SILICA AGGLOMERATE AND METHOD OF PREPARING AND USING SAME

FIELD OF INVENTION

This application relates to preparation of microporous fluorinated silica particles.

BACKGROUND OF INVENTION

Fluorinated silica supports containing organo-chromium compound or organomagnesium complexes were disclosed as a catalysts for the polymerization of ethylene and its copolymerization with other olefins in U.S. Pat. Nos. 4,100,337 and 4,359,403. The catalysts were prepared by mixing particles of reactive silica carrying superficial active —OH or oxide groups with a fluorine compound e.g., ammonium fluoride, ammonium tetrafluoroborate or ammonium hexafluorosilicate and heating the mixture at 50°–700° C. in presence of a solvent.

Japanese Patent Publication J03279209-A disclosed a procedure of fluorination of white silica particle from tetraethylorthosilicate with hydrogen fluoride and heating the mixture to 600° C. to obtain fluorinated black silica particle.

U.S. Pat. No. 5,064,796 disclosed an olefin polymerization catalyst produced by reacting a fluorinated silica support with a vanadium compound. The fluorinated silica is produced by mixing silica with a fluorine compound e.g., hydrogen fluoride, ammonium fluoride or a metal fluoride at 200–1000° C.

U.S. Pat. No. 4,822,903 disclosed a fluorinated siliceous catalyst for the catalytic synthesis of aromatic/aliphatic nitrites and is comprised of a plurality of silica particulates with the fluorine content ranging from about 0.1 to about 1% by weight based upon silica. The product gel was comminuted to grains which has a specific surface area ranging from about 200–250 m$^2$/g, an average pore volume ranging from about 1–1.3 cm$^3$/g and an average pore diameter ranging from about 100–150 A$^0$. The fluorinated silica was characterized as a microporous acid silica at a pH 1–3 for use as a catalyst.

SUMMARY OF INVENTION

What is needed is a method of preparing microporous fluorinated silica agglomerate. The present invention solves that problem by utilizing a structuring agent for the preparation of microporous fluorinated silica agglomerate in a fluoride-ion medium. Whereas such procedure is known to have been used for the preparation of silica-rich zeolite (U.S. Pat. Nos. 3,702,886; 4,061,724; 4,073,865; and French Patent Publications 2,564,451 and 2,567,868), the present invention concerns the making of fluorinated silica in agglomerated form.

The present invention discloses the preparation of microporous fluorinated silica particles by reaction of colloidal silica of small particle sizes with an alkylamine (or a hindered amine) and hydrofluoric acid or with alkylammonium fluoride, under convenient laboratory conditions at an atmospheric pressure.

The materials in the dry form are microcrystalline or amorphous depending on the type of alkylamine used. The microporous characteristics of the silica agglomerate were established by scanning electron microscope (SEM), transmission electron micrography (TEM) and BET surface areas analyses.

The fluorinated silica agglomerate can be used as a pigment management system in the preparation of inkjet receptor media according to the disclosure of copending, coassigned U.S. patent application Ser. No. 08/892,902 (Atty. Docket No.53473USA1A), the disclosure of which is incorporated by reference herein.

A feature of the fluorinated silica agglomerate is its functionalized character to permit interaction with dispersants that surround pigment particles of an inkjet ink.

An advantage of the fluorinated silica agglomerate is its ease of preparation under convenient and conventional laboratory and manufacturing conditions.

Further features and advantages emerge from a discussion of embodiments of the invention.

EMBODIMENTS OF INVENTION

The use of fluoride ion as a flux component for the crystal growth from a melt is as well known as its mineralizing role in hydrothermal synthesis. But it is only recently that the role of fluoride ion was established in the development of silica-rich microporous materials for the silica-rich zeolites discussed above. In this process the replacement of hydroxide anion by the fluoride ion as mineralizers make it possible to obtain silica-rich zeolite in acid pH.

In the present invention, the starting silica source is colloidal silica (commercially available under the brand of "Nalco 2326" from Nalco Chemical Co.) of very small particle size (~2–5 nm) stabilized at pH ~12 wherein the mobilizing ions are the OH$^-$ ions.

This silica sol can be diluted with water and mixed with varying amount of alkylamine at ambient temperature. Use of hydrofluoric acid to fluorinate the silica can be arranged in a concentration of from about 40% to about 50% and preferably about 48% in water and prior to use, was further diluted to 20–24 % with deionized water.

Addition of the diluted hydrofluoric acid to the mechanically stirred mixture of silica and alkylamine at ambient temperature is likely to cause a mild exothermicity which can be further cooled down by adding deionized water as required.

After the addition of all the hydrofluoric acid, the system can be stirred for half an hour to disperse the formed gel and then heated to vigorous water-reflux under mechanical stirring at about 100–200 rpm. The pH in the system was ~4–6 in the beginning of the reaction and at this pH, F$^-$ ions are the mobilizing agents from both hydrofluoric acid as well as from in-situ-generated alkylammonium fluoride.

In an alternative embodiment, pre-prepared alkylammonium fluorides can be used as the mobilizing F$^-$ ion source. At the end of the reaction, the pH of the medium is about 7–8.

In the present invention, colloidal silica of very small particle size is used ranging from about 5 to about 10 nm and preferably from about 2 to about 5 nm. Numerous sources of silicon having a degree of oxidation of +4 can be used. Examples of suitable silica sources can include, but are not limited to those selected from silica hydrogels, aerogels, xerogels, and colloidal suspensions thereof; precipitated silica; alkylorthosilicates; hydrolyzable tetravalent silicon compound, (such as silicon halides) and the like.

In order to make agglomeration of the silica particles, a structuring agent such as an alkylammonium cation was used. Fluorinated silica particles form agglomeration around the cation, wherein the cation acts as a templating cation. Structuring agents suitable for use according to the present invention are:

(a) quaternary alkylammonium Fluoride of formula I for the cation:

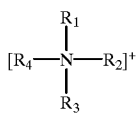

wherein $R_1$ to $R_4$ may be H or alkyl group or hybrid thereof representing primary, secondary, tertiary and quaternary alkylammonium cations.

(b) alkylamines of formula II:

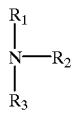

wherein $R_1$ to $R_3$ may vary between H and alkyl groups representing primary, secondary and tertiary alkylamine. The $R_1$–$R_3$ may altogether represent such alkyl groups as to form cyclic group(s) to give a hindered amine.

(c) any compound in Formula I or II in which nitrogen atom may be replaced by phosphorus atom.

Examples of suitable structuring agents consisting of alkylamines and the corresponding quaternary salts may include but are not limited to those selected from alkylamines such as methyl-, ethyl-, propyl- butyl-, amyl-, cycloalkyl-, alkylaryl-, aralkyl-, dialkyl-, trialkylamines. In the preferred embodiment of the inventions, the structuring agents are the propylammonium cations including primary, secondary and tertiary propylammonium cations. More specifically the structuring agents are the isopropylammonium cations including isopropyl-, diisopropyl- and triisopropylammonium cations. And even more specifically, isopropylammonium cation. The structuring agents may also a hindered amine e.g., a quinuclidine. The structuring agents may be introduced in the form of a base or a salt both being aqueous soluble, which determines the pH range of the reaction medium.

The preparation of fluorinated silica of the present invention may be effected by heating the reaction mixture to a temperature of from approximately 60° to 200° C., preferably from 60° to 150° C. over a period of time of approximately 1 to 5 days depending on the alkylamine used under a constant mechanical stirring at 100 to 200 rpm. The system is operated under one atmospheric pressure (no closed system e.g., autoclave, no autogenic pressure) under commonly used laboratory conditions easily adaptable for industrial scale up, unlike those closed systems required for the preparation of siliceous zeolites in a fluoride ion-medium.

After stipulated time, there is obtained a dispersion of white opaque material in about 14–17% solid. The system may further be concentrated to obtain solid in the range of 18–23%. The dispersion thus obtained are suitable for use as coatings after appropriate admixing with suitable binder(s) onto various substrates without further precipitation, isolation, separation or modification or treatment. The general procedure of preparation of the developed fluorinated silica agglomerate is outlined below in Formula III Formula III

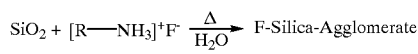

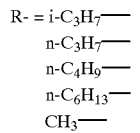

Or

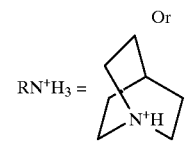

In the preparation of the fluorinated silica in the present invention, hydrofluoric acid or its alkylammonium salt was used as a dilute aqueous solution and when added to the mixture of silica source and/or alkylamine at ambient temperature, no observable corrosion was detected in the glassware or glass-stirrer which were repeatedly used. The hydrofluoric acid was therefore, found to be rapidly reacting with the amine in a reaction where it is used as such.

EXAMPLES

Example-1

(a) $SiO_2$-isopropyl-$NH_2$-HF system

To 100 g (15% solid, 15 g, 0.245 mole) of a colloidal silica sol (Nalco 2326, average particle size ~4 nm) in a three-neck flask fitted with a reflux condenser and a mechanical stirrer was added 45 g (0.75 mole) isopropylamine under stirring at room temperature. To the mixture was dropwise added, at room temperature, after dilution with 100 g de-ionized water, 30 g (50% in water, 15 g, 0.75 mole) hydrofluoric acid under stirring. The system was somewhat exothermic and during the addition of acid, 50 g de-ionized water was added under stirring to disperse the formed gel. After the addition of all the acid, the system was heated to vigorous refluxing of water under mechanical stirring of about 150–200 rpm. After 3–5 days a white colloidal system resulted.

The material in combination with a binder copolymer of n-vinylpyrrolidone and dimethylaminoethylmethacrylate (copolymer-958, from ISP) was coated onto a polyvinyl chloride (PVC) base and dried at 100° C. for 4 mins. The dry coating was subjected to SEM which showed a highly microporous surface. The sample had a surface porosity of 0.1–0.7 $\mu$m.

The colloidal material in very dilute suspension was then subjected to TEM analysis which shows a microcrystalline morphology. Transmission electron micrograph of the sample, further, show that the material exists in cluster or agglomerate form—fluorinated silica agglomerate.

Part of the resulting sol was dried at 110° C. to obtain a white powder which was analyzed for elements. The elemental analysis was as follows: %C 17.4, %H 5.1, %N 6.6, %Si 24.0, %F 26.0.

X-ray diffraction pattern (Cu-K$\alpha$ radiation, Philips vertical diffractometer) indicated that some of the developed materials are crystalline while some of them are amorphous. As carbon-chain length in the amine is decreased, crystallinity is decreased. Thus, amine of $C_6$-carbon gives more crystalline material than that of $C_1$-carbon. Material with cyclic amine e.g., with nuclidine gives completely amorphous material. The x-ray reflection peaks in any of the sample does not match with either mica or crystalline silica or pure-silica zeolite. The sharp x-ray diffraction pattern indicates ordered crystalline phase but the slopy and broad reflection at higher 2θ indicates some degree of disordered structures in the bulk.

Some of the fluorinated silica from isopropylammonium fluoride has been subjected to thermogravimatric analysis from ambient to 600° C. in a platinum pan. About 14% weight loss was observed at about 225° C. The volatile components as identified by their mass spectra are found to be isopropylamine, isopropylammonium fluoride and water. BET specific surface area measurement shows that the sample has a SSA of about 210–250m²/g with a pore volume of 0.12 cc/g and a pore diameter of 110–140 A°.

(b) $SiO_2$-i-pr-$NH_3^+F^-$ system:

To 100 g (15% solid, 15 g, 0.245 mole) of a colloidal silica sol (Nalco 2326, average particle size ~4 nm) in a three-neck flask fitted with a reflux condenser and a mechanical stirrer was added 59.3 g (0.75 mole) isopropylammonium fluoride [prepared from 45 g (0.75 mole) isopropylamine in 50 g water and 30 g (50% in water, 0.75 mole) hydrofluoric acid in 50 g water at room temperature] under stirring at room temperature. The system was somewhat exothermic and during the addition of the ammonium salt 100 g de-ionized water was added under stirring to disperse the formed gel. The system was heated to vigorous refluxing of water under mechanical stirring of about 200 rpm. After 5–6 days a white colloidal system resulted.

EXAMPLE-2
$SiO_2$-(i-pr)$_2$-NH-HF system:

To 100 g (15% solid, 15 g, 0.245 mole) of a colloidal silica sol (Nalco 2326, average particle size ~4 nm) in a three-neck flask fitted with a reflux condenser and a mechanical stirrer was added 75.8 g (0.75 mole) diisopropylamine under stirring at room temperature. To the mixture was dropwise added, at room temperature, 30 g (50% in water, 15 g, 0.75 mole) hydrogen fluoride under stirring. The system was somewhat exothermic and during the addition of acid 100 g de-ionized water was added. After the addition of all the acid, the system was heated to vigorous refluxing of water under mechanical stirring of about 200 rpm. After 3–5 days a white colloidal system resulted.

Example-3
$SiO_2$-n-pr-$NH_2$-HF system:

To 100 g (15% solid, 15 g, 0.245 mole) of a colloidal silica sol (Nalco 2326, average particle size ~4 nm) in a three-neck flask fitted with a reflux condenser and a mechanical stirrer was added 45 g (0.75 mole) n-opropylamine under stirring at room temperature. To the mixture was dropwise added, at room temperature, 30 g (50% in water, 15 g, 0.75 mole) hydrogen fluoride under stirring. The system was somewhat exothermic and during the addition of acid 100 g de-ionized water was added. After the addition of all the acid, the system was heated to vigorous refluxing of water under mechanical stirring of about 200 rpm. After 5–6 days a white colloidal system resulted.

Example-4

The procedure in Example-3 was repeated replacing n-propylamine by n-butylamine and n-hexylamine to obtain the dispersion of aggregated silica particles.

Example-5

To 40 g (15% solid, 6 g, 0.10 mole) of a colloidal silica sol (Nalco 2326, average particle size ~4 nm) in a three-neck flask fitted with a reflux condenser and a mechanical stirrer was added 10 g (0.08 mole) quinuclidine under stirring at room temperature. To the mixture was dropwise added, at room temperature, after dilution with 110 g de-ionized water, 8 g (50% in water, 4 g, 0.20 mole) hydrofluoric acid under stirring. After the addition of all the acid, the system was heated to vigorous refluxing of water under mechanical stirring of about 100–200 rpm for 18 hrs. After this period of time an opaque colloidal dispersion resulted.

The material in combination with a binder copolymer of n-vinylpyrrolidone and dimethylaminoethylmethacrylate (copolymer-958, from ISP) was coated onto a polyvinyl chloride (PVC) base and dried at 100° C. for 4 mins. The dry coating was subjected to SEM analysis which showed a highly microporous surface. The sample had a surface porosity ranging from 0.1 to 1.2 μm.

Preferred fluorinated silica agglomerates are those fluorinated silica wherein the silicon center is hexacoordinated.

Fluorinated silica agglomerates can be used in any mechanism that requires both a microporous particulate regime and a functional surface for interaction with other compositions favorably with fluorinated surfaces of the particles of the agglomerates. One preferred usage is as a pigment management system in association with a fluid management system in the formation of inkjet receptor media for pigment-based and dye-based inkjet inks.

The invention is not limited to the above embodiments. The claims follow.

What is claimed is:

1. A composition of matter, comprising:

fluorinated silica, $SiO_2$, $RNH_3^+F^-$ and $H_2O$, wherein R is selected from the group consisting of i-$C_3H_7$; n-$C_3H_7$; i-$C_4H_9$; and $CH_3$.

2. The composition of claim 1 prepared by digesting colloidal silica of very small particle size with a source of fluoride ion under heating and mechanical agitation.

3. The composition of claim 2 wherein the preparative conditions involve vigorous water-reflux and mechanical agitation of about 100–200 revolutions per minute.

4. The composition of claim 2 wherein the fluorinated silica is in agglomerated form.

5. The composition of claim 4 wherein the fluorinated silica agglomerate has a surface porosity of 0.1 to 1.2 μm.

6. The composition of claim 1 wherein the F⁻ comprises alkylammonium fluoride, which is derived from an alkylamine of $C_6$–$C_1$ carbon and HF.

7. A method of making the fluorinated silica agglomerate of composition of claim 1, comprising the steps of (a) reacting colloidal silica with a fluorinated compound according the following equation:

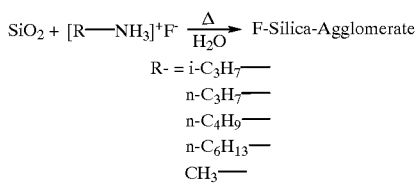

-continued $$RN^+H_3 = $$ 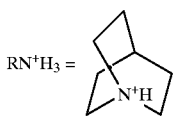

(b) forming a dispersion of the F-Silica Agglomerate.

8. The method of claim 7, wherein the reacting step comprises digesting colloidal silica of very small particle size with a source of fluoride ion under heating and mechanical agitation.

9. The method of claim 7, wherein the reacting step comprises adding dilute hydrofluoric acid solution to a mixture of colloidal silica and an alkylamine at ambient temperature followed by aqueous refluxation.

10. A composition of matter comprising a colloidal dispersion in an aqueous medium, the composition comprising fluorinated silica, $SiO_2$, $RNH_3^+F^-$ and $H_2O$, wherein R is selected from the group consisting of i-$C_3H_7$; n-$C_3H_7$; i-$C_4H_9$; i-$C_3H_7$; and $CH_3$, and wherein materials other than the fluorinated silica are occluded in the bulk of the composition of matter.

11. A composition of matter, comprising:
fluorinated silica, $SiO_2$, $RNH_3^+F^-$ and $H_2O$, wherein R is selected from the group consisting of i-$C_3H_7$; n-$C_3H_7$; i-$C_4H_9$; i-$C_3H_7$; and $CH_3$, wherein the composition is in the form of a fluorinated silica agglomerate impregnated with alkylamine, alkylammonium fluoride, silica and water and wherein labile compounds can be removed by thermal/vacuum means.

12. The composition of matter of claim 11, after removing the labile compounds, wherein a silicon center of the fluorinated silica is hexacoordinated.

13. The composition of claim 12 wherein the fluorinated silica is in the form of microcrystals.

14. The composition of claim 13 wherein the microcrystals are obtained by the use of an alkylammonium fluoride of higher carbon chain-length.

15. The composition of matter of claim 13 wherein fluorinated silica of amorphous phase are obtained by the use of a hindered amine-HF or its fluoride.

16. The composition of claim 12 wherein microcrystals have crystallite sizes in the range of 100–500 A$^0$ and wherein materials other than the fluorinated silica are occluded in the bulk of the composition of matter.

17. The composition of claim 12 wherein the fluorinated silica agglomerate has a BET SSA in the range of 210–240 m$^2$/g.

18. The composition of claim 12 wherein the fluorinated silica agglomerate has a BET pore diameter of 120–140 A$^0$.

19. The composition of claim 12 wherein the fluorinated silica agglomerate has a BET pore volume of 0.12–0.20 cc/g.

* * * * *

UNITED STATES PATENT AND TRADEMARK OFFICE
CERTIFICATE OF CORRECTION

PATENT NO.    : 6,071,614
DATED         : June 6, 2000
INVENTOR(S)   : Omar Faroog It is certified that error appears in the above-identified patent and that said Letters Patent is hereby corrected as shown below:

Column 1,
Line 33, "nitrites" should read -- nitriles --;

Column 6,
Line 37, after H2O," insert -- wherein materials other than the fluorinated silica occluded in the bulk of the composition of matter, --;

Column 8,
Line 16, "claim 12" should read -- claim 13 --.

Signed and Sealed this

Twentieth Day of November, 2001

Attest:

*Nicholas P. Godici*

NICHOLAS P. GODICI
*Attesting Officer*      *Acting Director of the United States Patent and Trademark Office*